Nov. 17, 1936.  J. A. POTTER ET AL  2,061,007
HEAT EXCHANGE APPARATUS
Original Filed April 17, 1933  2 Sheets-Sheet 1

WITNESSES:
E. Lutz

INVENTORS
JOHN A. POTTER, &
JOHN P. RATHBUN.
BY
A. B. Reavis
ATTORNEY

Nov. 17, 1936.    J. A. POTTER ET AL    2,061,007
HEAT EXCHANGE APPARATUS
Original Filed April 17, 1933    2 Sheets-Sheet 2
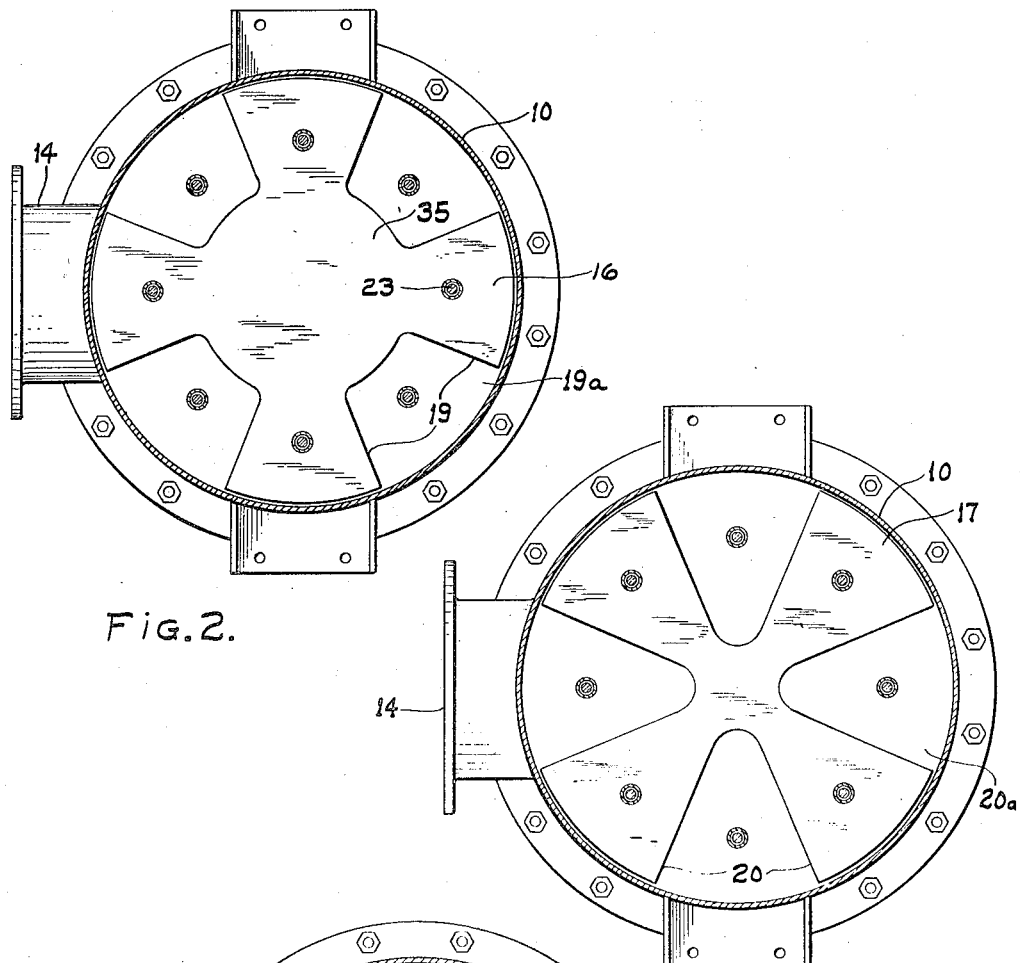
Fig. 2.
Fig. 3.
Fig. 4.
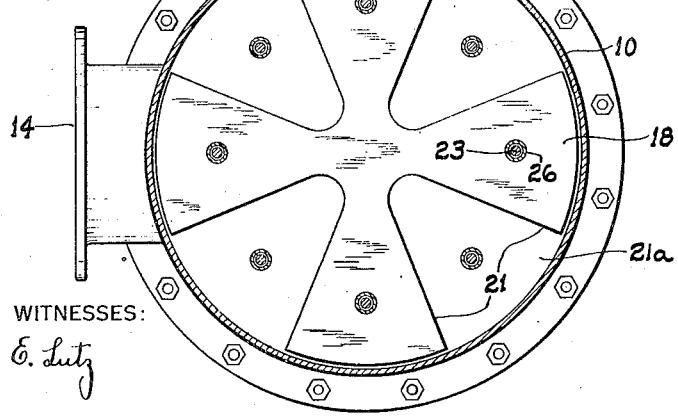
INVENTORS
JOHN A. POTTER, &
JOHN P. RATHBUN.
BY
ATTORNEY Patented Nov. 17, 1936

2,061,007

UNITED STATES PATENT OFFICE 2,061,007

HEAT EXCHANGE APPARATUS

John A. Potter and John P. Rathbun, Prospect Park, Pa., assignors to Westinghouse Electric & Manufacturing Company, East Pittsburgh, Pa., a corporation of Pennsylvania Application April 17, 1933, Serial No. 666,582
Renewed May 17, 1934

6 Claims. (Cl. 261—114)

Our invention relates to condensers of the type wherein condensation is effected by bringing steam in contact with water caused by flow over spaced baffle plates, the directions of flow of the steam and water being generally opposite, and it has for its object to provide improved apparatus of this character which shall be highly effective in operation and susceptible of economical manufacture.

In accordance with our invention, we provide a vertical shell having an air outlet and a water inlet at the top and a water outlet and a steam inlet at the bottom. Water passes downwardly from the inlet over baffle plates having staggered radial portions and contacts with upwardly flowing steam to condense the latter. The baffle plates are constructed and arranged to provide for complete baffling or interception of media flowing in opposite directions without interposing undue resistance; and, to this end, the baffle plates have outwardly-diverging radial portions of an upper plate being disposed over the spaces of a lower plate.

The baffle structure is comprised by a plurality of plates cut from suitable metallic plate material and spaced in horizontal relation interiorly of the shell. Means is preferably arranged interiorly of the upper portion of she shell and cooperating with the water inlet to provide a chamber from which water overflows, the overflowing water being intercepted by the uppermost baffle plate. Media must pass through the sheet of overflowing water before going to the air outlet. Water intercepted by the top plate spreads over the latter and drops in sheet formation to the plate immediately below and so on from plate to plate, steam and non-condensable media passing through the rain sheets in moving upwardly from below each plate to the space thereabove.

These and other objects are effected by my invention as will be apparent from the following description and claims taken in connection with the accompanying drawings forming a part of this application, in which:

Figs. 2, 3 and 4 are sectional views along the lines II—II, III—III, and IV—IV, respectively, of Fig. 1.

Figure 1:
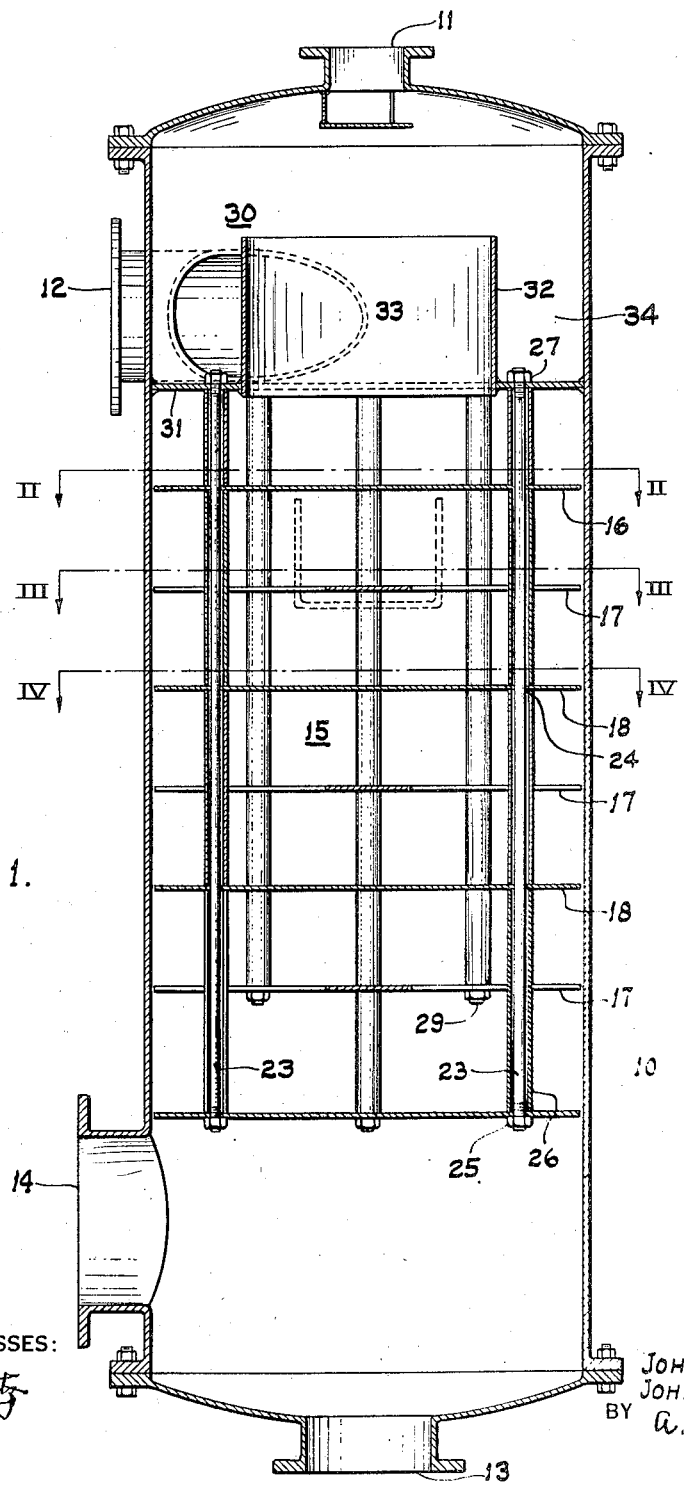
Fig. 1 is a vertical sectional view of our improved condenser.

Referring to the drawings in detail, we show a shell 10 having an air outlet 11 and a water inlet 12 at the top portion and a water outlet 13 and a steam inlet 14 at the bottom portion thereof. A baffle structure, at 15, facilitates contact of downwardly moving water and upwardly moving steam to promote condensation of the latter.

The baffle structure embodies spaced horizontal plates 16, 17 and 18 supported interiorly of the shell, the plates having radial portions 19, 20 and 21, respectively, and intervening spaces 19a, 20a and 21a, the radial portions of each upper plate being disposed above the intervening spaces of the plate immediately below.

The sides of the radial portions 19, 20, and 21 are preferably along radial lines. The arcuate extent of the radial portions of each plate 16 are preferably approximately equal to the arcuate extent of the spaces therebetween.

The baffle structure, at 15, is made up of first and second sets of plates, the first set consisting of the top plate 16 and plates 18 and the second set consisting of plates 17 alternately arranged with respect to the plates of the first set. While the sets of plates may be supported interiorly of the shell in various ways, we prefer to support them by suspension rods. To this end, the plates 16 and 18 are carried by suspension rods 23, the rods extending through openings 24 provided in the radial portions 19 and 21, the lowermost plate resting on bottom heads or nuts 25 of the rods, the plates being held in spaced relation by sleeves or ferrules 26 of larger diameter than the openings and the upper ends of the rods being suspended from the shell by means including top or upper nuts 27. By tightening the nuts 25 and 27, not only will the plates be supported properly, but a rigid baffle structure will be provided. In like manner, the plates 17 of the second set are supported by rods 29. As the radial portions of the plates of the first set aline with the spaces of the second set plates and as the second set radial portions aline with the first set spaces, the suspension rods 24 of the first set are disposed in the arcuate spaces of the second set and the second set rods 29 are disposed in the first set arcuate spaces.

A structure, at 30, cooperates with the shell 10 to provide a chamber for the water inlet 12, the structure preferably comprising an annular bottom portion 31 welded outwardly to the interior of the shell and inwardly to a tubular wall 32, the wall 32 preferably extending above the inlet to seal the latter and defining an opening 33 for the downward passage of water overflowing from the channel 34. It will be apparent that the water will tend to flow downwardly in an annular sheet adhering to the tubular wall and that air and non-condensable gases will flow upwardly through the core space of the sheet to the air outlet. The annular bottom portion 31 also preferably comprises the suspension means for the upper ends of the rods 24 and 29. The top baffle plate 16 has an uninterrupted portion 35 which intercepts the water passing through the opening 33, thereby providing an annular sheet through which media must pass to enter the core space, the water then falling in sheets from plate to plate and upwardly moving media having to pass through the sheets in passing from space to space between plates.

From the foregoing, it will be apparent that we have devised a condenser utilizing the counterflow principle so as to secure efficient action with highly effective cooling of air and non-condensable gases, minimum temperature of the air and non-condensable gases being assured due to the fact that the latter contacts with cooler and cooler water and with the incoming water before leaving the shell. As the spaces of each lower plate are covered by radial portions of an upper plate, thorough baffling with minimum flow resistance and flow of medium through rain sheets are assured.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are imposed by the prior art or as are specifically set forth in the appended claims.

What we claim is:—

1. In a condenser, a vertical shell having an air outlet and a water inlet at the upper portion thereof and a water outlet and a steam inlet at the lower portion thereof; and a baffle structure disposed between the water and steam inlets, said baffle structure including a first set of horizontal baffle plates alternately arranged with respect to a second set of horizontal baffle plates, each baffle plate having radial portions with intervening spaces and the radial portions of each set being alined with the spaces of the other set, first set suspension rods connected to the radial portions of the plates of the first set and arranged in the spaces of the plates of the second set, second set suspension rods connected to the radial portions of the plates of the second set and arranged in the spaces of the plates of the first set, and means providing for the support of the upper ends of said suspension rods from the shell.

2. In a condenser, a vertical shell having an air outlet and a water inlet at the upper portion thereof and a water outlet and a steam inlet at the lower portion thereof; means including an inner upwardly-extending cylindrical wall cooperating with said shell to define a channel communicating with said inlet and the wall defining an opening downwardly through which passes water overflowing the upper edge of the wall from said channel; and a baffle structure disposed between the channel and the steam inlet and including a plurality of horizontal plates having staggered radial portions and suspension rods connected to the plates for supporting and maintaining the latter in spaced relation, the upper ends of said suspension rods being supported from the channel bottom.

3. The combination as claimed in claim 2 wherein the channel is formed by an annular plate having its exterior edge welded to the interior of the shell and having its interior edge welded to the cylindrical wall.

4. The combination as claimed in claim 2 wherein the top baffle plate is arranged to intercept the rain sheet falling from the opening defined by the cylindrical wall and wherein rain sheets dropping from sides of radial portions of each upper plate are intercepted by radial portions of a plate below, whereby steam and non-condensable gases moving upwardly pass through sheets in going from the space below a plate to the space thereabove and finally through the sheet dropping from the cylindrical wall before reaching the air outlet to condense steam and cool air.

5. In heat exchange apparatus, a vertical shell having a liquid inlet at the upper portion thereof, a liquid outlet at the lower portion thereof, and an inlet for gaseous fluid; and a baffle structure disposed between the liquid inlet and outlet, said baffle structure including a first set of horizontal baffle plates alternately arranged with respect to a second set of horizontal baffle plates, the baffle plates of the first set having open spaces for the passage of fluid and the baffle plates of the second set having spaces disposed out of registry with the spaces of the first set, first set suspension rods connected to the plates of the first set and arranged in the spaces of the plates of the second set, second set suspension rods connected to the plates of the second set and arranged in the spaces of the plates of the first set, and means providing for the support of the upper ends of said suspension rods from the shell.

6. In heat exchange apparatus, a vertical shell having a liquid inlet at the upper portion thereof, a liquid outlet at the lower portion thereof, and an inlet for gaseous fluid; and a baffle structure disposed between the liquid inlet and outlet, said baffle structure including a first set of horizontal baffle plates alternately arranged with respect to a second set of horizontal baffle plates, each baffle plate having radial portions with intervening spaces and the radial portions of each set being alined with the spaces of the other set, first set suspension rods connected to the radial portions of the plates of the first set and arranged in the spaces of the plates of the second set, second set suspension rods connected to the radial portions of the plates of the second set and arranged in the spaces of the plates of the first set, and means providing for the support of the upper ends of said suspension rods from the shell.

JOHN A. POTTER.
JOHN P. RATHBUN.